(12) United States Patent
Murata et al.

(10) Patent No.: US 10,280,823 B2
(45) Date of Patent: May 7, 2019

(54) ENGINE CONTROL DEVICE

(71) Applicant: TOYOTA JIDOSHA KABUSHIKI KAISHA, Toyota-shi (JP)

(72) Inventors: Toshio Murata, Toyota (JP); Tadashi Nakagawa, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 12 days.

(21) Appl. No.: 15/213,955

(22) Filed: Jul. 19, 2016

(65) Prior Publication Data
US 2017/0058747 A1    Mar. 2, 2017

(30) Foreign Application Priority Data
Aug. 25, 2015 (JP) .................. 2015-165730

(51) Int. Cl.
*F01N 9/00* (2006.01)
*F01N 3/00* (2006.01)
*F01N 5/02* (2006.01)

(52) U.S. Cl.
CPC .............. *F01N 9/00* (2013.01); *F01N 3/005* (2013.01); *F01N 5/02* (2013.01); *F01N 2240/02* (2013.01);
(Continued)

(58) Field of Classification Search
CPC ... F01N 3/005; F01N 5/02; F01N 9/00; F01N 2240/02; F01N 2430/00; F01N 2570/22;
(Continued)

(56) References Cited

U.S. PATENT DOCUMENTS 6,073,440 A * 6/2000 Douta .................. F01N 11/007
60/276
6,116,213 A    9/2000 Yasui et al.
(Continued)

FOREIGN PATENT DOCUMENTS

EP    0 874 151 A2    10/1998
JP    2006-161593    6/2006
(Continued)

OTHER PUBLICATIONS

Notice of Allowance issued in U.S. Appl. No. 15/069,624 dated Jun. 12, 2018.
(Continued)

*Primary Examiner* — Ngoc T Nguyen
*Assistant Examiner* — Matthew T Largi
(74) *Attorney, Agent, or Firm* — Oblon, McClelland, Maier & Neustadt, L.L.P.

(57) ABSTRACT

The present disclosure provides an engine control device including: an adjustment section that adjusts a flow amount per unit time of exhaust gas from an engine; and a control section that, in a case in which a temperature below freezing point is detected by a temperature detection section that detects an external air temperature or an intake air temperature, a preceding engine operation duration is shorter than a first duration, and a value in a predetermined range in which water in an exhaust pipe can be drained by the flow amount being raised by a certain amount is detected by a value detection section that detects a value representing an acceleration, an accelerator opening or an engine rotation speed, controls the adjustment section so as to raise the flow amount by the certain amount until a second duration has passed from starting of the engine.

6 Claims, 6 Drawing Sheets

(52) U.S. Cl.
CPC ...... *F01N 2430/00* (2013.01); *F01N 2570/22* (2013.01); *F01N 2590/11* (2013.01); *F01N 2900/102* (2013.01); *F01N 2900/12* (2013.01); *F01N 2900/1411* (2013.01); *Y02T 10/16* (2013.01); *Y02T 10/20* (2013.01); *Y02T 10/47* (2013.01)

(58) Field of Classification Search
CPC ........... F01N 2590/11; F01N 2900/102; F01N 2900/12; F01N 2900/1411
See application file for complete search history.

(56) References Cited

U.S. PATENT DOCUMENTS

| | | | | |
|---|---|---|---|---|
| 6,295,808 | B1* | 10/2001 | Griffin | F02D 41/062 60/274 |
| 2002/0134340 | A1* | 9/2002 | Watanabe | F02D 41/067 123/179.18 |
| 2006/0236678 | A1 | 10/2006 | Tanada et al. | |
| 2007/0017482 | A1 | 1/2007 | Nakashima et al. | |
| 2007/0255485 | A1* | 11/2007 | Kaita | B60K 6/445 701/102 |
| 2008/0098986 | A1 | 5/2008 | McKay et al. | |
| 2009/0032213 | A1* | 2/2009 | Mukoubara | B60H 1/20 165/41 |
| 2010/0180578 | A1* | 7/2010 | Goda | B60K 6/365 60/285 |
| 2011/0004392 | A1 | 1/2011 | Senda et al. | |
| 2011/0178665 | A1* | 7/2011 | Yoshioka | B60W 10/06 701/22 |
| 2012/0221185 | A1* | 8/2012 | Yamazaki | B60K 6/445 701/22 |
| 2013/0024088 | A1 | 1/2013 | Suzuki et al. | |
| 2015/0047609 | A1 | 2/2015 | Kleczewski et al. | |
| 2015/0218998 | A1 | 8/2015 | Ishihata et al. | |
| 2016/0298558 | A1 | 10/2016 | Murata | |

FOREIGN PATENT DOCUMENTS

| | | | |
|---|---|---|---|
| JP | 2006161593 A | * | 6/2006 |
| JP | 2009-264267 A | | 11/2009 |
| JP | 2012-61898 A | | 3/2012 |
| JP | 2015-145663 A | | 8/2015 |
| KR | 10-2007-0088933 A | | 8/2007 |

OTHER PUBLICATIONS

Extended European Search Report dated Nov. 2, 2016 in European Patent Application No. 16161024.1, citing documents AH and AQ therein, 6 pages.

Office Action dated Jan. 23, 2018 in co-pending U.S. Appl. No. 15/069,624.

Supplemental Notice of Allowability issued in U.S. Appl. No. 15/069,624 dated Sep. 7, 2018.

\* cited by examiner

|     | CONDITIONS |
| --- | --- |
| (1) | EXTERNAL AIR TEMPERATURE BELOW 0°C |
| (2) | DURATION AFTER STARTING OF THE ENGINE IS LESS THAN 10 MINUTES (DURATION MAY BE SUBSTITUTED WITH GASOLINE CONSUMPTION AMOUNT, TEMPERATURE OF THE COOLING WATER) |
| (3) | PRECEDING CONTINUOUS ENGINE OPERATION DURATION WAS LESS THAN 10 MINUTES |
| (4) | CONDITIONS (1) TO (3) + WHEN ENGINE ROTATION SPEED IS INTERMITTENTLY RAISED FOR FEW SECONDS AT FEW MINUTES INTERVALS |
| (5) | CONDITIONS (1) TO (3) + WHEN THE VEHICLE SPEED IS OVER 10 KM/H |
| (6) | CONDITIONS (1) TO (3) + WHEN MAXIMUM ASPIRATED AIR AMOUNT SINCE START OF CONTROL EXCEEDS PREDETERMINED VALUE |
| (7) | CONDITIONS (1) TO (3) + REVERSING (R) RANGE |
| (8) | COMBINATION OF CONDITIONS (1) TO (3) + (4) TO (7) |

FIG.6

ENGINE CONTROL DEVICE

CROSS-REFERENCE TO RELATED APPLICATION

This application claims priority under 35 USC 119 from Japanese Patent Application No. 2015-165730, filed on Aug. 25, 2015 the disclosure of which is incorporated by reference herein.

BACKGROUND

Technical Field

The present disclosure relates to an engine control device.

Related Art

Japanese Patent Application Laid-Open (JP-A) No. 2006-161593 discloses an engine running mode that uses motive power from an engine, an EV driving mode that uses motive power from a motor-generator, and a hybrid running mode that uses motive power from both the engine and the motor-generator. Further, it is disclosed that, when a stop condition of the EV running mode is encountered, an engine rotation speed is raised and engine noise increases, which prompts a driver to perform a switching operation to the engine running mode or the hybrid running mode.

In a vehicle equipped with this engine, if an external air temperature is below freezing point and a preceding running duration was short, condensed water that remains in an exhaust pipe may freeze. Accordingly, in a case in which water is freezing in the exhaust pipe, it is necessary to raise the engine rotation speed in order to exhaust condensed water and melt ice in the exhaust pipe. However, this happens with a different timing from the stop condition of the EV running mode in JP-A No. 2006-161593. Therefore, there is scope for improvement.

SUMMARY

The present disclosure provides an engine control device that may promote drainage of condensed water and melting of frozen water in an exhaust pipe.

An engine control device of a first aspect includes: an adjustment section that adjusts a flow amount per unit time of exhaust gas exhausted from an engine; and a control section that, in a case in which a temperature below freezing point is detected by a temperature detection section that detects an external air temperature or an intake air temperature, a preceding engine operation duration is shorter than a pre-specified first duration, and a value in a predetermined range in which water in an exhaust pipe can be drained by the flow amount being raised by a certain amount is detected by a value detection section that detects a value representing an acceleration, an accelerator opening or an engine rotation speed, controls the adjustment section so as to raise the flow amount by the certain amount until a pre-specified second duration has passed from starting of the engine.

According to the above first aspect, the flow amount per unit time of the exhaust gas exhausted from the engine is adjusted by the adjustment section.

At the control section, in a case in which a temperature below freezing point is detected by the temperature detection section that detects an external air temperature or intake air temperature, and in a case in which the preceding engine running duration was shorter than the pre-specified first duration, and in a case in which the value detection section that detects the value representing an acceleration, an accelerator opening or an engine rotation speed detects a value in the predetermined range in which water in the exhaust pipe could be drained by the flow amount being raised by the certain amount, then the control section controls the adjustment section so as to raise the flow amount by the certain amount until the pre-specified second duration has passed from the engine starting. That is, in a case in which the temperature is below freezing point, the preceding engine running duration was short and the acceleration, accelerator opening or engine rotation speed is in the predetermined range, freezing is likely to occur in the exhaust pipe. Accordingly, drainage of condensed water and melting of frozen water in the exhaust pipe may be promoted by the control by the control section. Note, however, that in a situation in which the acceleration is above the predetermined range and drainage of condensed water is possible even without applying the control to raise the flow amount, the control to raise the flow amount is not performed.

A second aspect, in the above first aspect, the adjustment section may adjust the flow amount per unit time of exhaust gas by adjusting the engine rotation speed, the control section may include a charging control section that, in a case in which a charge amount of a battery, in a hybrid vehicle that is equipped with an engine and a motor-generator as drive sources for running, is below a pre-specified threshold, controls charging of the battery such that the motor-generator is driven by motive power of the engine and charges the battery, and the control section may control the charging control section so as to charge the battery with motive power corresponding to a rise in the engine rotation speed that is produced by the control of the adjustment section to raise the flow amount by the certain amount. Namely, motive power that is produced as a result of the flow amount of exhaust gas being raised by the certain amount is consumed by the charging control section. Therefore, both deterioration in fuel consumption may be prevented and an unintended acceleration due to the rise in engine rotation speed may be prevented.

A third aspect, in the above second aspect, the charging control section may end the charging of the battery in a case in which the charge amount of the battery reaches at least a pre-specified reference value, and the control section, in a case in which adjusting the flow amount of exhaust gas, may alter the reference value and control the charging control section. Thus, a range in which both deterioration in fuel consumption and prevention in unintended acceleration may be expanded.

A fourth aspect, in the above first aspect, the adjustment section may adjust the flow amount per unit time of exhaust gas by adjusting the engine rotation speed, and the control section may control a consumption section that is for consuming motive power corresponding to a rise in the engine rotation speed so as to consume motive power corresponding to a rise in the engine rotation speed that is produced by the control of the adjustment section. Thus, an unintended acceleration due to the rise in engine rotation speed may be prevented.

A fifth aspect, in the above aspects, may further include an exhaust heat recovery unit, provided at a downstream side of a catalyst that cleans the exhaust gas, that recovers heat from the exhaust gas. Thus, exhaust heat may be recovered and utilized.

According to the above aspects, the present disclosure may be provide an engine control device that may promote drainage of condensed water and melting of frozen water in an exhaust pipe.

BRIEF DESCRIPTION OF THE DRAWINGS

Exemplary embodiments will be described in detail based on the following figures, wherein.

DETAILED DESCRIPTION

Figure 1:
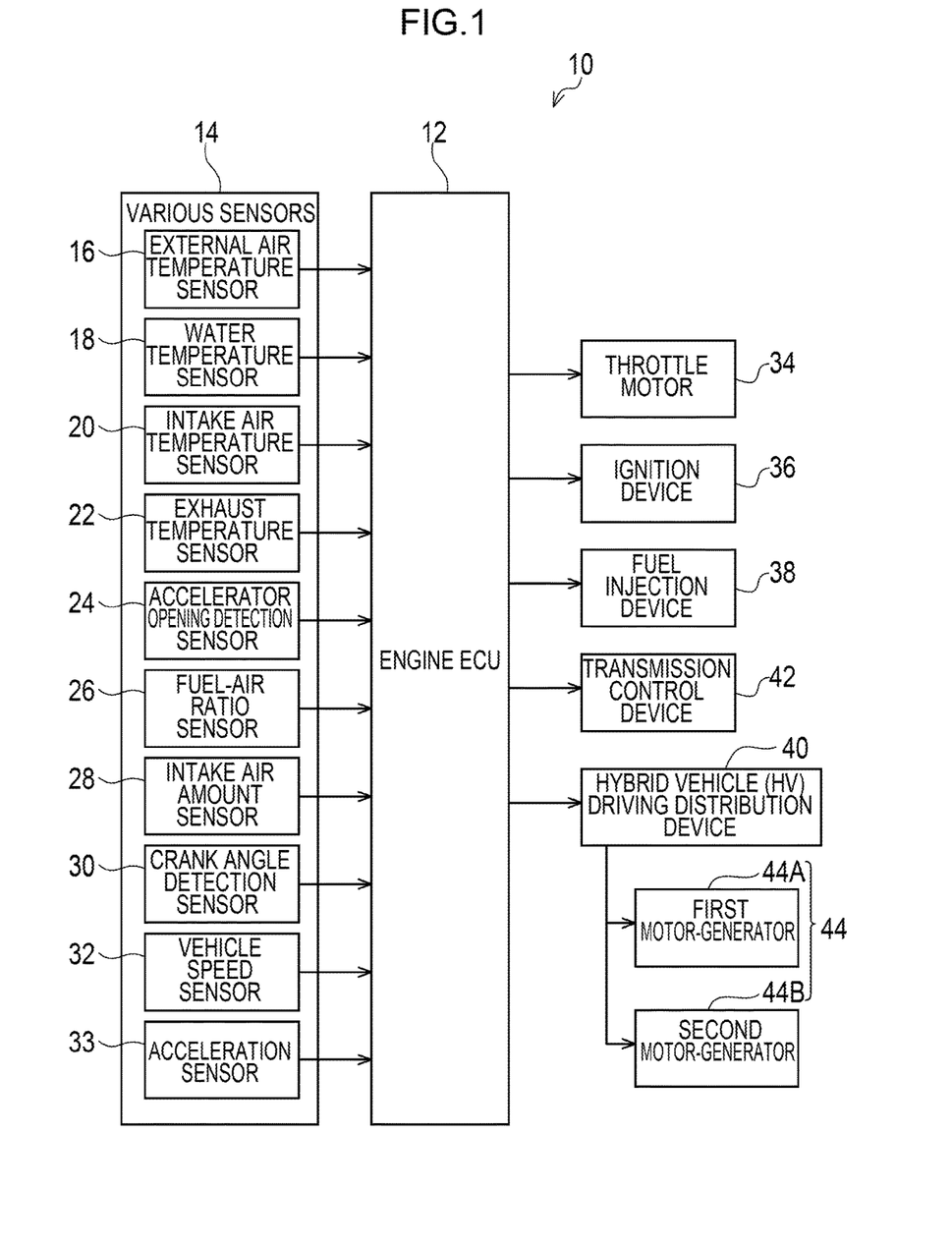
FIG. 1 is a block diagram showing schematic structures of an engine control device in accordance with a present exemplary embodiment.

Herebelow, an exemplary embodiment is described in detail with reference to the attached drawings. FIG. 1 is a block diagram showing schematic structures of an engine control device in accordance with the present exemplary embodiment. Below, an engine control device that is installed in a hybrid car is taken as an example of the engine control device and described. The hybrid car is equipped with an engine and a motor-generator as drive sources for running.

An engine control device 10 according to the present exemplary embodiment is equipped with an engine ECU (electronic control unit) 12, which serve as a control section that controls operations of the engine and as a charging control section. The engine ECU 12 is constituted by a microcomputer including a central processing unit (CPU), a read-only memory (ROM), a random access memory (RAM) and the like.

Various sensors 14 for controlling operations of the engine are connected to the engine ECU 12. The engine ECU 12 controls operations of the engine on the basis of detection results from the various sensors 14. The various sensors 14 that are connected include an external air temperature sensor 16, a water temperature sensor 18, an accelerator opening detection sensor 24, an intake air temperature sensor 20, an exhaust temperature sensor 22, a fuel-air ratio sensor 26, an intake air amount sensor 28, a crank angle detection sensor 30, a vehicle speed sensor 32 and an acceleration sensor 33. These various sensors 14 are an example and the above description is not limiting. Any of the various sensors 14 may be omitted and alternative sensors may be included. The external air temperature sensor 16 and intake air temperature sensor 20 correspond to a temperature detection section, and the accelerator opening detection sensor 24, crank angle detection sensor 30 and acceleration sensor 33 correspond to a value detection section.

The external air temperature sensor 16 detects external air temperatures, the water temperature sensor 18 detects temperatures of cooling water in the engine, the intake air temperature sensor 20 detects intake air temperatures, and the exhaust temperature sensor 22 detects temperatures of exhaust gas. The accelerator opening detection sensor 24 detects accelerator opening amounts, the fuel-air ratio sensor 26 detects fuel-air ratios of exhaust gas from the engine, the intake air amount sensor 28 detects air amounts aspirated into the engine, the crank angle detection sensor 30 detects crank angles, and the vehicle speed sensor 32 detects vehicle speeds.

For controlling operations of the engine, a throttle motor 34, an ignition device 36, a fuel injection device 38, a hybrid vehicle (HV) driving distribution device 40 and a transmission control device 42 are also connected to the engine ECU 12. The throttle motor 34 drives a throttle that adjusts aspirated air amounts to the engine in correspondence with an adjustment section. Thus, the throttle motor 34 alters a throttle opening amount and adjusts the engine rotation speed. The ignition device 36 generates sparks required for commencing combustion of a fuel-air mixture compressed in cylinders of the engine. The fuel injection device 38 supplies the fuel-air mixture into the cylinders of the engine by injecting fuel. In response to a consumption section, the HV driving distribution device 40 controls a driving distribution between the engine and a motor-generator 44, which are drive sources for running, and controls driving of the motor-generator 44. When starting of the engine is required, the HV driving distribution device 40 outputs an engine start request to the engine ECU 12. In response to the consumption section, the transmission control device 42 controls a gear ratio of a transmission in which the gear ratio can be altered (for example, a continuously variable transmission or the like). The transmission control device 42 includes a function for detecting gearshift positions such as a reversing position and the like, and controls alterations of the gear ratio at the transmission.

On the basis of detection results from the various sensors 14, the engine ECU 12 controls operations of the engine by controlling the throttle motor 34, the ignition device 36, the fuel injection device 38 and the like. The engine ECU 12 also controls the driving distribution between the engine and the motor-generator 44, the transmission and the like in accordance with circumstances.

In the present exemplary embodiment, a first motor-generator 44A and a second motor-generator 44B are provided to serve as the motor-generator 44. The first motor-generator 44A principally functions as a generator for charging a battery or as a generator for supplying electric power to the second motor-generator 44B. The first motor-generator 44A is powered by motive power from the engine. The second motor-generator 44B principally functions as a generator that supplements power output from the engine. Although two motor-generators are provided in the present exemplary embodiment, there may be a single motor-generator.

Figure 2:
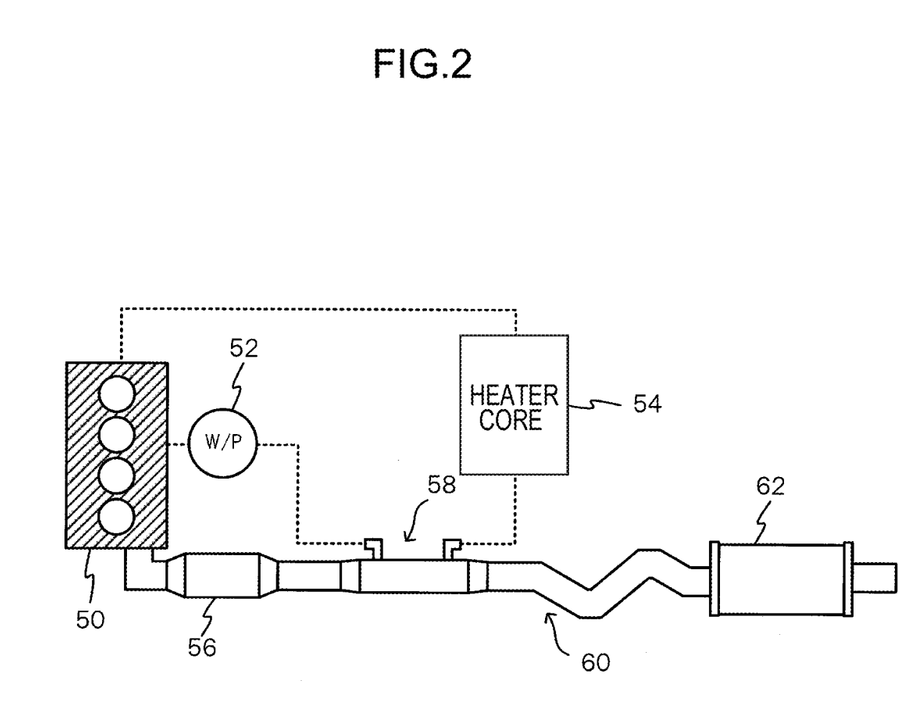
FIG. 2 is a diagram for describing an exhaust heat recovery unit.

An exhaust heat recovery unit is provided in the vehicle in which the engine control device 10 according to the present exemplary embodiment is installed. FIG. 2 is a diagram for describing the exhaust heat recovery unit.

An exhaust heat recovery unit 58 is provided on an exhaust pipe 60 through which exhaust gas of the automobile passes. The exhaust heat recovery unit 58 recovers heat from the exhaust gas from the engine of the automobile and utilizes the heat for heating, promoting engine warm-up and the like.

For example, as shown in FIG. 2, an exhaust path of the exhaust pipe 60 exhausts exhaust gas from an engine 50, and a catalytic device 56, the exhaust heat recovery unit 58 and a main muffler 62 are arranged in this order from upstream on the exhaust path.

The exhaust heat recovery unit 58 is provided at the downstream side of the catalytic device 56 and recovers heat from the exhaust gas. To be specific, cooling water for cooling the engine 50 is circulated to the exhaust heat recovery unit 58 by a water pump (W/P) 52. Cooling water that is circulated to the exhaust heat recovery unit 58 flows through a heater core 54 and is returned to the engine 50.

That is, the exhaust heat recovery unit 58 is provided on a flow path of the cooling water; heat in the exhaust gas may be recovered by the exhaust heat recovery unit 58, may raise the temperature of the cooling water, and may be utilized as a heat source for a heater. In this structure, the water pump 52 of an electric type that is driven by a motor or the like, is employed. Thus, a flow amount of cooling water flowing through the exhaust heat recovery unit 58 may be varied, and recovered amounts of exhaust heat may be adjusted by adjustment of the flow amount of cooling water flowing through the exhaust heat recovery unit 58.

Now, in a vehicle that is running with the engine 50, if condensed water is produced in the exhaust pipe 60 and falls below freezing point without being exhausted, the water may freeze. If condensed water freezes inside the exhaust pipe 60, depending on running conditions, it is possible that the water may not be melted but remains in the exhaust pipe 60. If the condensed water remains in the frozen state and more condensed water is produced and freezes, exhaust performance may deteriorate, which may lead to a loss of engine output power, a worsening of exhaust noise within the vehicle and suchlike. In particular, in a vehicle that is a hybrid vehicle and that is equipped with the exhaust heat recovery unit 58 as in the present exemplary embodiment, condensed water is easily produced because of the engine stopping during running. Furthermore, the exhaust pipe 60 is provided with differences in height thereof as shown in FIG. 2, in order to avoid other components. Consequently, condensed water is unlikely to be drained to the rear unless the flow speed of the exhaust gas (i.e., the engine rotation speed) is at least a certain level.

Accordingly, in the present exemplary embodiment, the engine ECU 12 performs control to raise the flow amount per unit time of the exhaust gas by a certain amount in order to drain condensed water and melt frozen water inside the exhaust pipe 60. The control to raise the flow amount of the exhaust gas is, specifically, that if pre-specified conditions with which freezing inside the exhaust pipe 60 is anticipated are met, the engine ECU 12 controls the throttle motor 34 so as to raise the engine rotation speed higher than in a pre-specified usual state. However, condensed water drainage performance, ice melting performance and the like vary depending on engine specifications (for example, exhaust amounts, compression ratio, exhaust port diameters and the like), and on the diameter of the exhaust pipe 60 and so forth. Therefore, the extent to which the flow amount is raised is specified in advance in accordance with engine specifications, the diameter of the exhaust pipe 60 and so forth. For example, a flow amount per unit time to which the exhaust gas flow amount is to be raised, at which condensed water may be drained and ice may be melted, is specified in advance in accordance with at least one of the engine specifications and the diameter of the exhaust pipe. An idling state after the end of a warm-up operation may be employed as the pre-specified usual state. Alternatively, an idling state that incorporates an engine control state (for example, a warm-up operation or the like) in which the flow amount of exhaust gas is raised by the engine rotation speed being raised in accordance with various corrections, such as a correction for external air temperature, a correction for water temperature, a correction for air pressure and the like, may be employed. Alternatively again, an operation state with a pre-specified engine rotation speed corresponding to an accelerator opening may be employed. The control by the engine ECU 12 to raise the flow amount of exhaust gas by the certain amount differs from control of a warm-up operation when cold is sensed. Moreover, although the engine rotation speed rises with vehicle speed, the control to raise the flow amount of exhaust gas includes control to increase the engine rotation speed further beyond a pre-specified level.

Figure 3:
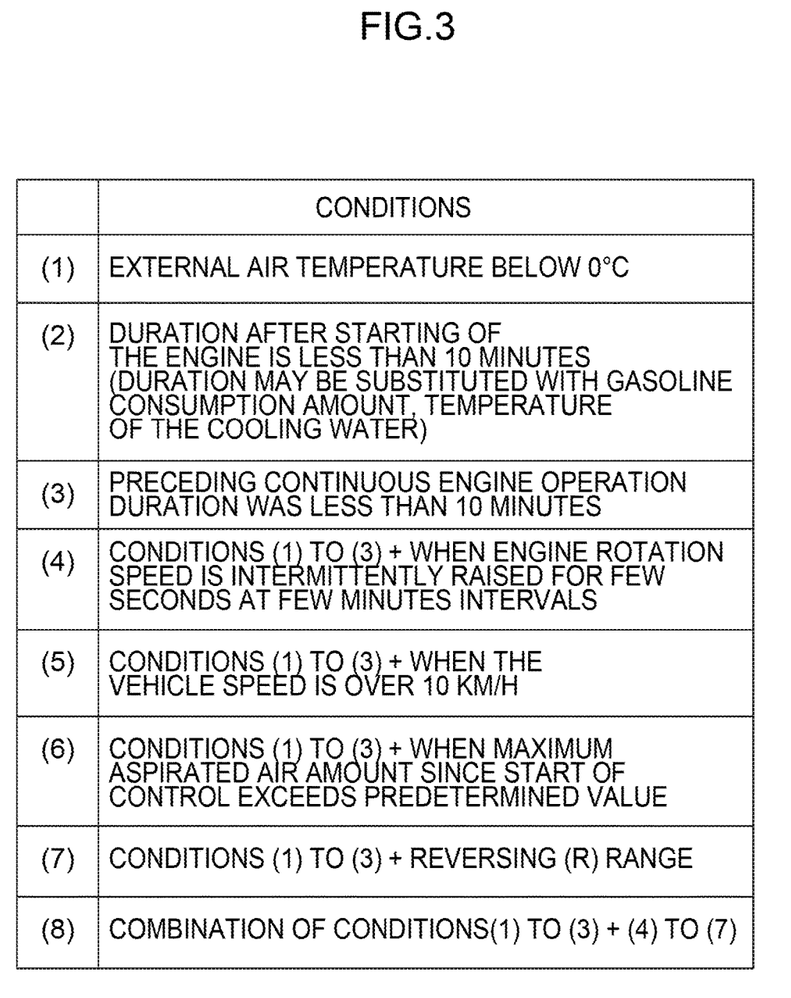
FIG. 3 is a table showing conditions for detecting freezing of condensed water in an exhaust pipe.

Conditions for detecting freezing of condensed water inside the exhaust pipe 60 may be, for example, conditions (1) to (3) shown in FIG. 3. Further, the flow amount of exhaust gas may be raised when supplementary conditions (4) to (8) apply in addition to conditions (1) to (3).

(1) When the external air temperature is below freezing point (0° C. or less), that is, when the external air temperature is a temperature at which condensed water in the exhaust pipe 60 freezes, the flow amount of exhaust gas is to be raised and condensed water and ice are to be exhausted.

(2) When an engine operation duration after starting of the engine is less than a predetermined duration (for example, 10 minutes), that is, a state prior to melting of any ice that has formed since a preceding run, the exhaust gas flow amount is to be raised for exhausting ice in order to prevent further deposition of ice. This duration may be substituted with a measurement that corresponds to the duration after the engine starting, of a gasoline consumption amount, a temperature of the cooling water, a number of successive rotations since the engine starting, or the like. A further predetermined duration after starting that is employed is a duration that is specified in advance in accordance with engine specifications and the diameter of the exhaust pipe 60, because produced heat amounts vary in accordance with engine specifications (for example, exhaust amounts, compression ratio, exhaust port diameters and the like), the diameter of the exhaust pipe 60 and so forth.

(3) In a state in which a preceding engine operation duration was less than a continuous predetermined duration (for example, 10 minutes) and ice from a run before the preceding run has not melted (a state in which ice worth of two operation cycles has deposited), the exhaust gas flow amount is to be raised and the ice is to be melted and exhausted. Because produced heat amounts vary depending on engine specifications, the diameter of the exhaust pipe 60 and the like, the predetermined duration that is employed is a duration specified in advance in accordance with the engine specifications and the diameter of the exhaust pipe 60.

(4) In addition to conditions (1) to (3), if control is performed to raise the rotation speed for an interval of several seconds once each several minutes (the engine rotation speed is intermittently raised for a pre-specified duration at pre-specified time intervals), condensed water is not always continuously exhausted; instead, condensed water deposit to some extent and is then exhausted.

(5) If condensed water is exhausted while the vehicle is parked, the condensed water soils a parking space such as a garage or the like. Therefore, in addition to conditions (1) to (3), if the vehicle speed is at least a predetermined vehicle speed (for example, 10 km/h), condensed water is exhausted during running. The predetermined vehicle speed is a vehicle speed indicating that running has started; it is not limited to 10 km/h.

(6) In addition to conditions (1) to (3), if a maximum Ga (corresponding to a maximum aspirated air amount, a maximum engine rotation speed or the like) since the start of control to raise the rotation speed exceeds a predetermined value (for example, 10 g/s), the control stops for several minutes (for example, 3 minutes) and subsequently restarts. That is, if the aspirated air amount exceeds a pre-specified air amount during running and the exhaust gas flow amount is high, the control to raise the rotation speed is unnecessary and is stopped. Thus, a deterioration in fuel efficiency is avoided.

(7) In addition to conditions (1) to (3), if the gearshift is in the reversing (R) range, then, given that there are no obstacles or people to the rear, draining water will not strike a person. Accordingly, the flow amount of exhaust gas is raised and condensed water and ice are exhausted.

(8) Conditions (4) to (7) are combined in addition to conditions (1) to (3). The above-described conditions (4) to (7) may be combined with conditions (1) to (3) as appropriate.

That is, in the present exemplary embodiment, if the external air temperature is below freezing point, and if the preceding engine operation duration was shorter than a pre-specified first duration, and if acceleration is in a pre-determined range (between a first acceleration and a second acceleration), then the above-described control to raise the flow rate of exhaust gas is applied until a pre-specified second duration has passed from the starting of the engine. The predetermined range of accelerations is a pre-specified range of low accelerations, which are accelerations in a range specified in advance in which condensed water is not exhausted by flow rates of exhaust gas but which are accelerations in a range in which condensed water inside the exhaust pipe 60 may be drained by the flow rates of exhaust gas being raised. That is, the first acceleration of the predetermined range is an acceleration at which condensed water may be drained by the flow rate of exhaust gas being raised by a certain amount, and the second acceleration is an acceleration at which condensed water may be drained without the flow rate of exhaust gas being raised. Because this predetermined range of accelerations is included in the conditions, unnecessary control may be suppressed and a deterioration in fuel efficiency may be avoided.

An accelerator opening detected by the accelerator opening detection sensor 24 or an engine rotation speed detected by the crank angle detection sensor 30 may be employed instead of the acceleration. That is, the conditions for raising the flow rate of exhaust gas that are employed may be: that the temperature is below freezing point, the preceding engine operation duration was shorter than the predetermined duration and the accelerator opening is in a predetermined range; that the temperature is below freezing point, the preceding engine operation duration was shorter than the predetermined duration and the rotation speed is in a predetermined range; or the like.

A control method for raising the flow amount of exhaust gas is control that raises the engine rotation speed in the present exemplary embodiment, but may be control to charge a battery that charges electric power to be supplied to the second motor-generator 44B (below referred to as P charging control). The meaning of the term "P charging control" includes control to drive the first motor-generator 44A with motive power from the engine and charge the battery. More specifically, if a charge amount SOC of the battery is below a minimum value (a threshold) $\alpha min$ of a target region $\alpha$, then if the engine has been stopped, the engine is started, and if the engine has been started, the engine rotation speed is raised. Hence, the first motor-generator 44A is driven by motive power from the engine and the battery is charged. If the charge amount SOC is above a maximum value $\alpha max$ of the target region $\alpha$, the engine ECU 12 controls the HV driving distribution device 40 so as to end charging. That is, the flow rate of exhaust gas may be raised by the certain amount by the engine ECU 12 controlling the HV distribution device 40 and performing P charging control. Here, when the flow rate of exhaust gas is raised by P charging control, the maximum value $\alpha max$ of the target region $\alpha$ of the charge amount SOC, which serves as a reference value for ending charging, is altered. For example, if charging is usually ended when the charge amount is 60%, the reference value for ending charging may be raised and altered such that charging is ended at 80% or the like. As a result, the range of P charging control may be expanded and a deterioration in fuel efficiency may be avoided.

Figure 4:
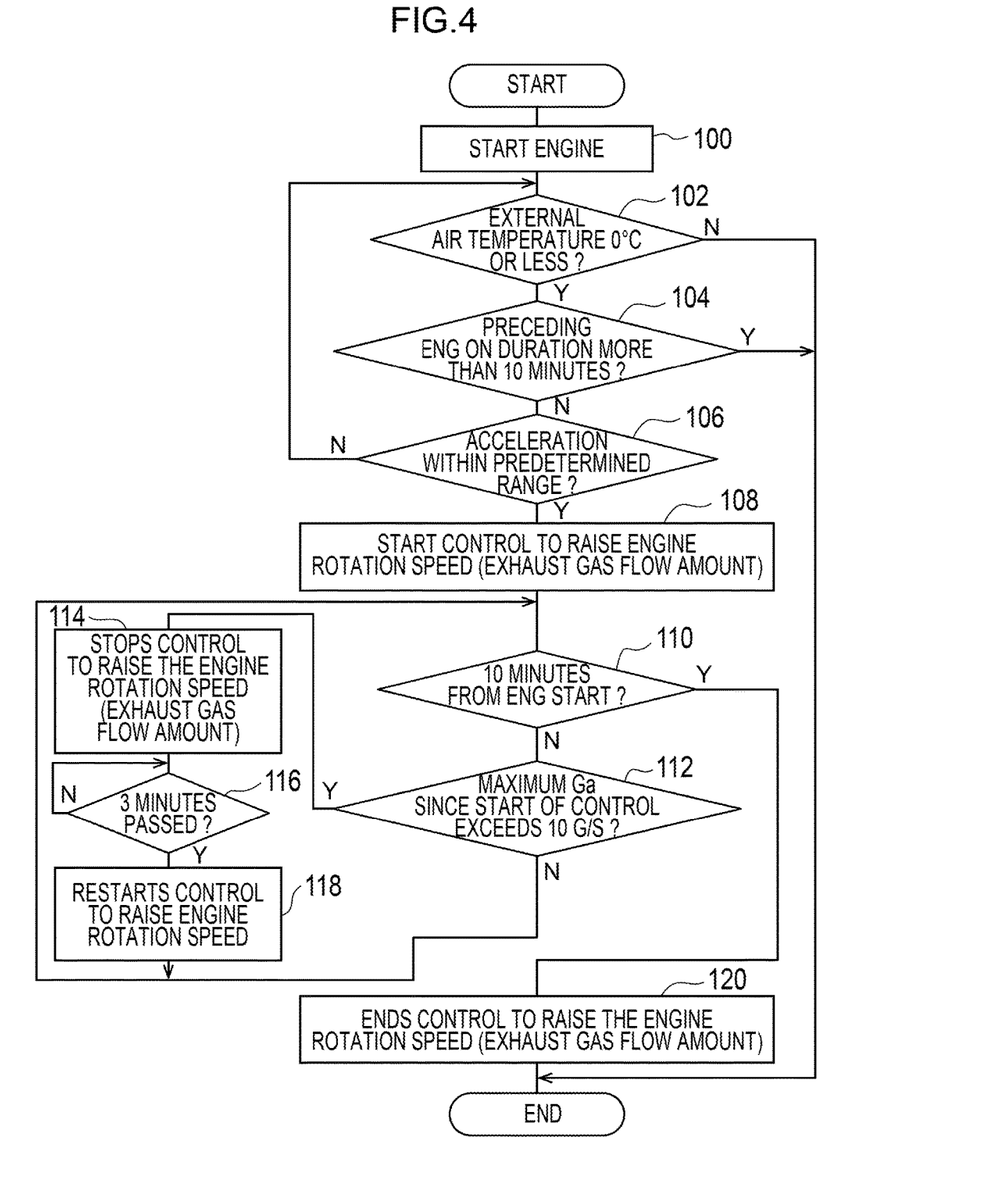
FIG. 4 is a flowchart showing a flow of processing that is executed by an engine ECU of the engine control device in accordance with the present exemplary embodiment.

Now, specific processing that is carried out by the engine ECU 12 of the engine control device 10 relating to the present exemplary embodiment structured as described above is described. FIG. 4 is a flowchart showing an example of a flow of processing that is executed by the engine ECU 12 of the engine control device 10 according to the present exemplary embodiment. The processing in FIG. 4 starts when the engine ECU 12 receives an engine start request outputted from the HV driving distribution device 40.

In step 100, the engine ECU 12 starts the engine, and then proceeds to step 102.

In step 102, the engine ECU 12 makes a determination as to whether an external air temperature is 0° C. or less from a detection result of the external air temperature sensor 16. If the result of the determination is affirmative, the engine ECU 12 proceeds to step 104, and if the result is negative, the engine ECU 12 ends the sequence of processing. The determination in step 102 may be a determination as to whether an intake air temperature is 0° C. or less instead of the external air temperature.

In step 104, the engine ECU 12 makes a determination as to whether a preceding engine operation duration (an ENG ON duration) was at least a predetermined duration (for example, 10 minutes). This determination is made by the preceding engine operation duration having been memorized at the engine ECU 12. If the result of this determination is negative, the engine ECU 12 proceeds to step 106, and if the result of the determination is affirmative, the engine ECU 12 ends the sequence of processing. The engine ECU 12 stops the engine when an ignition switch, which is not shown in the drawings, is turned OFF or when the engine ECU 12 receives an engine stop request. The term "engine operation duration" may refer to an integrated value Ga of exhaust gas flow amounts calculated from aspirated air amounts, engine rotation speeds or the like.

In step 106, the engine ECU 12 makes a determination as to whether the acceleration is in the predetermined range from a detection result from the acceleration sensor 33. If the result of this determination is affirmative, the engine ECU 12 proceeds to step 108, and if the result is negative, the engine ECU 12 returns to step 102 and repeats the processing described above.

In step 108, the engine ECU 12 starts control to raise the engine rotation speed (the exhaust gas flow amount) and then proceeds to step 110. For example, the engine ECU 12 raises the flow amount of exhaust gas by driving the throttle motor 34 to raise the engine rotation speed by the certain amount. As a result, condensed water and ice in the exhaust pipe 60 are exhausted. However, an unintended acceleration may result from raising the engine rotation speed of an engine. Therefore, for example, the driving distribution between the engine and the second motor-generator 44B may be controlled by the HV driving distribution device 40 and motive power that is produced by the raising of the engine rotation speed may be consumed, which may prevent an unintended acceleration. Alternatively, the gear ratio may be altered by control of the transmission control device 42 and motive power that is produced by the raising of the engine rotation speed may be consumed, which may prevent an unintended acceleration. As a further alternative, the engine ECU 12 may control the HV driving distribution device 40 so as to switch to P charging control and drive the first motor-generator 44A with motive power corresponding to the raising of the engine rotation speed, which may cause the motive power produced by the raising of the engine rotation speed to be consumed by charging of the battery and prevent an unintended acceleration. In a case of switching to P charging control, as described above, the value of αmax that serves as the reference value for stopping P charging control is changed to a larger value than usual. Alternatively, the engine ECU 12 may perform control that combines these measures as appropriate so as to consume the motive power corresponding to the raising of the engine rotation speed. This control to raise the engine rotation speed, rather than being performed continuously, may be performed, for example, intermittently for only a few seconds once each several minutes.

In step 110, the engine ECU 12 makes a determination as to whether at least a predetermined duration (for example, 10 minutes) has passed from the starting of the engine. If the result of this determination is negative, the engine ECU 12 proceeds to step 112, and if the result is affirmative, the engine ECU 12 proceeds to step 120.

In step 112, the engine ECU 12 makes a determination as to whether a maximum Ga (the maximum aspirated air amount, maximum engine rotation speed or the like) since the start of control to raise the engine rotation speed exceeds a predetermined value (for example, 10 g/s). If the result of this determination is affirmative, the engine ECU 12 proceeds to step 114, and if the result is negative, the engine ECU 12 returns to step 110 and repeats the processing described above.

In step 114, the engine ECU 12 stops the control to raise the engine rotation speed (the exhaust gas flow amount), and then proceeds to step 116.

In step 116, the engine ECU 12 makes a determination as to whether a predetermined duration (for example, 3 minutes) has passed since the stopping of the control to raise the engine rotation speed. The engine ECU 12 waits until the result of this determination is affirmative, and then proceeds to step 118.

In step 118, the engine ECU 12 restarts the control to raise the engine rotation speed, and then returns to step 110 and repeats the processing described above. That is, if the exhaust gas flow amount rises during running, control to raise the rotation speed is unnecessary, so is temporarily stopped and is restarted after a predetermined duration has passed.

On the other hand, in step 120, if the engine ECU 12 is performing control to raise the engine rotation speed, the engine ECU 12 stops the control and ends the sequence of processing. When stopping the control to raise the engine rotation speed, the engine ECU 12 returns to the pre-specified usual state gradually so as not to cause disturbance to vehicle occupants.

Thus, by performing control to raise the engine rotation speed, the engine ECU 12 may promote drainage of condensed water and melting of frozen water in the exhaust pipe 60.

Now, an alternative example of the engine control device according to the present exemplary embodiment is described. In this alternative example, P charging is utilized as control for raising the flow amount of exhaust gas, so as to raise the flow amount of exhaust gas. Basic structures are the same as in the exemplary embodiment described above, so are not described in detail here.

In the alternative example, if the external air temperature is below freezing point, the preceding engine operation duration was shorter than a predetermined duration, and the acceleration is in a predetermined acceleration range, a P charging map is altered to raise the flow amount of exhaust gas by a certain amount.

To be specific, pre-specified fuel consumption maps for maximizing efficiency and a water-blowing map for exhausting condensed water are provided to serve as a P charging map, and the flow amount of exhaust gas is raised by switching the P charging map. The water-blowing map is a map configured such that αmax of the charge amount SOC at which charging stops is changed to a larger value and such that P charging control is switched to in the predetermined acceleration range described in the exemplary embodiment above.

Figure 5:
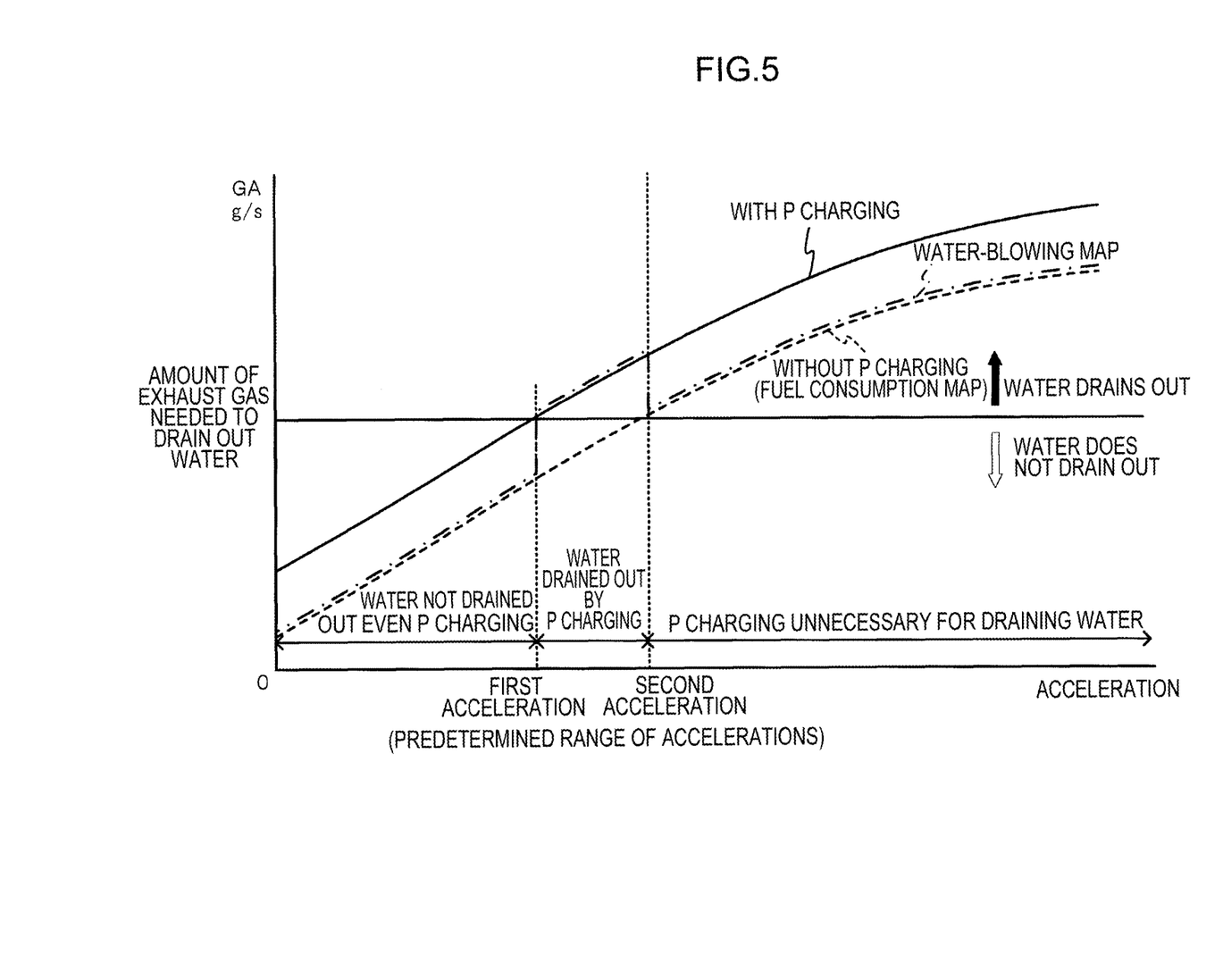
FIG. 5 is a diagram for describing fuel consumption maps and a water-blowing map that serve as P charging maps.

As shown in FIG. 5, where the fuel consumption map (without P charging) is a map that produces gas flow amounts that may drain condensed water at accelerations above the second acceleration, the water-blowing map is a map that enables drainage of condensed water in the pre-determined range of accelerations by performing P charging control. In the fuel consumption map (without P charging) shown in FIG. 5, water would not be drained out below the first acceleration even if P charging control were performed, and water is drained out above the second acceleration even if P charging control is not performed. Therefore, P charging control is unnecessary in these regions. Accordingly, in the water-blowing map P, charging control is performed only in the region of the predetermined range of accelerations.

In this alternative example, because the water-blowing map is used to switch to P charging control when acceleration is in the predetermined range during progressive acceleration, both drainage of condensed water and fuel efficiency may be achieved. "With P charging" in FIG. 5 indicates maximum values of Ga determined in consideration of noise and the like, which are set appropriately in accordance with the type of vehicle and the like. Although the engine rotation speed is raised by the P charging control, power corresponding to this rise is consumed in charging of the battery. Therefore, deterioration in fuel efficiency may be prevented and an unintended acceleration may be prevented.

In this alternative example, the reference value for ending charging of the battery is altered when the water-blowing map is switched to, as described in the above exemplary embodiment. Therefore, a range in which both deterioration in fuel efficiency and prevention in unintended acceleration, may be expanded.

In the alternative example too, as described for the exemplary embodiment above, an accelerator opening detected by the accelerator opening detection sensor 24 or an engine rotation speed detected by the crank angle detection sensor 30 may be employed instead of the acceleration. That is, a map such that P charging control is switched to in a predetermined range of accelerator openings or rotation speeds may be employed as the water-blowing map.

Figure 6:
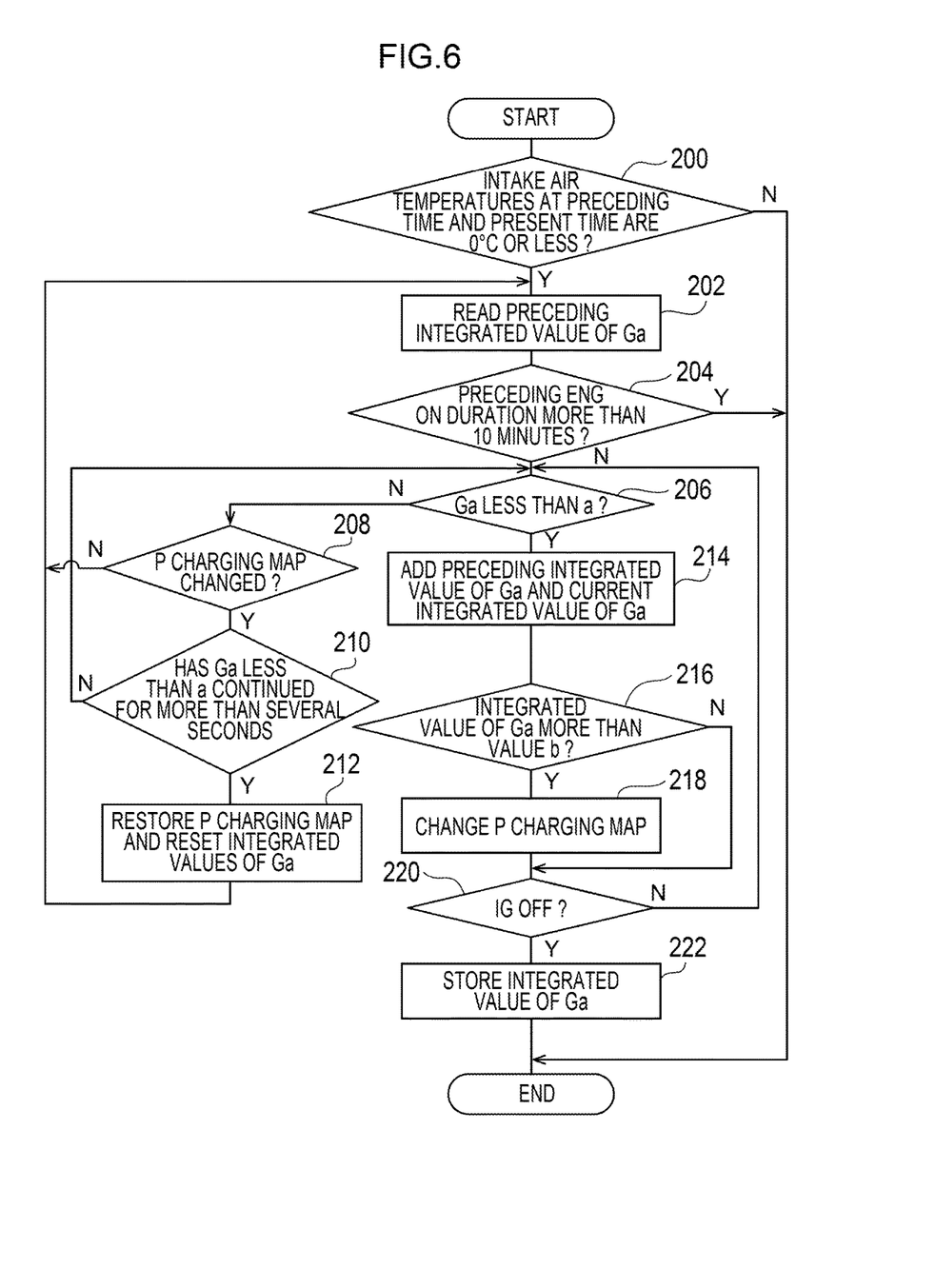
FIG. 6 is a flowchart showing a flow of processing that is executed by an engine ECU of an alternative example of the engine control device in accordance with the present exemplary embodiment.

Now, specific processing that is carried out by the engine ECU 12 of the engine control device 10 relating to the alternative example is described. FIG. 6 is a flowchart showing an example of a flow of processing that is executed by the engine ECU 12 of the engine control device 10 according to the alternative example. The processing in FIG. 6 starts when an ignition switch (IG), which is not shown in the drawings, is turned ON.

In step 200, the engine ECU 12 makes a determination from detection results of the intake air temperature sensor 20 as to whether intake air temperatures at times of the IG being turned on a preceding time and the present time are 0° C. or less. If the result of this determination is affirmative, the engine ECU 12 proceeds to step 202, and if the result is negative, the engine ECU 12 ends the sequence of processing. The determination of step 200 may be a determination as to whether, as in the exemplary embodiment described above, the external air temperature is 0° C. or less instead of the intake air temperature.

In step 202, the engine ECU 12 reads a preceding integrated value of Ga, and then proceeds to step 204.

In step 204, the engine ECU 12 makes a determination as to whether the preceding engine operation duration (ENG ON duration) was at least a predetermined duration (for example, 10 minutes). This determination is made by the preceding engine operation duration having been memorized at the engine ECU 12. If the result of this determination is negative, the engine ECU 12 proceeds to step 206, and if the result is affirmative, the engine ECU 12 ends the sequence of processing. An integrated value Ga of exhaust gas flow amounts that is calculated from aspirated air amounts, engine rotation speeds or the like may be employed as the engine operation duration.

In step 206, the engine ECU 12 makes a determination as to whether Ga (the aspirated air amount, engine rotation speed or the like) is less than a pre-specified value a. If the result of this determination is negative, the engine ECU 12 proceeds to step 208, and if the result is affirmative, the engine ECU 12 proceeds to step 214.

In step 208, the engine ECU 12 makes a determination as to whether the P charging map has been changed. This determination is a determination as to whether the P charging map has been changed to the water-blowing map in step 218, which is described below. If the result of the determination is affirmative, the engine ECU 12 proceeds to step 210, and if the result is negative, the engine ECU 12 returns to step 202 and repeats the processing described above.

In step 210, the engine ECU 12 makes a determination as to whether the state in which Ga is less than a (the aspirated air amount or engine rotation speed is at a level at which the flow amount of exhaust gas is small and condensed water is not being exhausted) has continued for more than several seconds (for example, 3 s). If the result of this determination is affirmative, the engine ECU 12 proceeds to step 212, and if the result is negative, the engine ECU 12 returns to step 202 and repeats the processing described above.

In step 212, the engine ECU 12 restores the P charging map (switches to the fuel efficiency map), resets the integrated values of Ga (the preceding and current integrated values of Ga), and then returns to step 202 and repeats the processing described above.

Alternatively, in step 214, the engine ECU 12 adds the preceding integrated value of Ga that has been read to the current integrated value of Ga, and then proceeds to step 216.

In step 216, the engine ECU 12 makes a determination as to whether the calculated integrated value of Ga is at least a pre-specified value b. That is, the engine ECU 12 makes a determination as to whether Ga continues to be small and a deposition amount of water has gone above a pre-specified value. If the result of the determination is affirmative, the engine ECU 12 proceeds to step 218 in order to raise the flow amount of exhaust gas, and if the result is negative, the engine ECU 12 proceeds to step 220.

In step 218, the engine ECU 12 changes the P charging map from the fuel efficiency map to the water-blowing map, and then proceeds to step 220. As a result, as shown in FIG. 5, the flow amount of exhaust gas is raised in the predetermined range of accelerations, and drainage of condensed water and melting of frozen water in the exhaust pipe 60 may be promoted.

In step 220, the engine ECU 12 makes a determination as to whether the ignition switch (IG) that is not shown in the drawings has been turned OFF. If the result of the determination is negative, the engine ECU 12 returns to step 206 and repeats the processing described above, and if the result is affirmative, the engine ECU 12 ends the sequence of processing.

Thus, in the alternative example, P charging control is performed when the external air temperature is below freezing point, the preceding engine operation duration is shorter than a predetermined duration, and the acceleration is in the predetermined acceleration range. Thus, the flow amount of exhaust gas may be raised and condensed water in the exhaust pipe 60 may be exhausted.

Moreover, condensed water may be exhausted efficiently by switching to P charging control during progressive acceleration.

Because P charging control is performed when in the predetermined range of accelerations, motive power for running is charged in the battery. Therefore, deterioration in fuel efficiency may be kept to minimum. Furthermore, because the motive power corresponding to the raising of the engine rotation speed is consumed by charging of the battery in accordance with the P charging control, an unintended acceleration caused by the raising of the engine rotation speed is prevented, and a disturbance of vehicle occupants by the raising of the engine rotation speed may be moderated.

In the exemplary embodiment described above, an example is described in which control is performed to raise the flow amount of exhaust gas by raising the engine rotation speed. However, control for raising the flow amount of exhaust gas is not limited thus. The flow amount of exhaust gas may be raised without raising the engine rotation speed by, for example, the throttle motor 34 being driven to widen the throttle opening and increase aspirated air amounts and the ignition device 36 being controlled to delay ignition timings.

In the exemplary embodiment and alternative example described above, a hybrid vehicle is given as an example and described, but the hybrid vehicle is not limiting. For example, the present disclosure may be applied to a vehicle that runs with only an engine.

In the exemplary embodiment and alternative example described above, a vehicle that is equipped with the exhaust heat recovery unit 58 is described as an example, but it will be clear that the present disclosure is applicable to a vehicle that is not equipped with the exhaust heat recovery unit 58.

The processing that is executed by the engine ECU 12 according to the exemplary embodiment and alternative example described above may be software processing that is implemented by a computer executing a program, and the processing may be implemented in hardware. Alternatively, the processing may combine both software and hardware. Further, if the processing is implemented in software, the program may be memorized in any of various storage media and distributed.

The present disclosure is not limited by the above recitations. In addition to the above recitations, it will be clear that numerous modifications may be embodied within a technical scope not departing from the gist of the disclosure.

What is claimed is:

1. An engine control device comprising:
   at least one of an accelerator opening detection sensor, a crank angle detection sensor, and an accelerator sensor which detects a value representing an acceleration;
   a throttle that adjusts a flow amount per unit time of exhaust gas exhausted from an engine; and
   when
   a temperature below freezing point is detected by a temperature sensor that detects an external air temperature or by an intake air temperature sensor,
   a preceding engine operation duration is shorter than a pre-specified first duration, and
   the detected value is in a predetermined range of acceleration values, in which water in an exhaust pipe can be drained by the flow amount being raised by a certain amount,
   an electronic control unit is configured to control the throttle so as to raise the flow amount by the certain amount until a pre-specified second duration has passed from starting of the engine.

2. The engine control device according to claim 1, wherein the throttle adjusts the flow amount per unit time of exhaust gas by adjusting the engine rotation speed, and
   wherein when a charge amount of a battery, in a hybrid vehicle that is equipped with an engine and a motor-generator as drive sources for running, is below a pre-specified threshold, the electronic control unit controls charging of the battery such that the motor-generator is driven by motive power of the engine and charges the battery, and charges the battery with motive power corresponding to a rise in the engine rotation speed that is produced by the control of the throttle to raise the flow amount by the certain amount.

3. The engine control device according to claim 2, wherein:
   the electronic control unit ends the charging of the battery when the charge amount of the battery reaches at least a pre-specified reference value, and when adjusting the flow amount of exhaust gas, alters the reference value.

4. The engine control device according to claim 1, further comprising:
   a driving distribution device that controls a driving distribution between the engine and a motor-generator,
   wherein the throttle adjusts the flow amount per unit time of exhaust gas by adjusting the engine rotation speed, and
   wherein the electronic control unit controls the driving distribution device corresponding to a rise in the engine rotation speed so as to consume motive power corresponding to a rise in the engine rotation speed that is produced by the control of the throttle.

5. The engine control device according to claim 1, further comprising an exhaust heat recovery unit, provided at a downstream side of a catalyst that cleans the exhaust gas, that recovers heat from the exhaust gas.

6. An engine control device comprising:
   a memory; and
   processing circuitry coupled to the memory, the processing circuitry configured to adjust a flow amount per unit time of exhaust gas exhausted from an engine, and raise the flow amount by a certain amount until a pre-specified second duration has passed from starting of the engine when
   a temperature below freezing point is detected in an external air temperature or an intake air temperature,
   a preceding engine operation duration is shorter than a pre-specified first duration, and
   a detected value is in a predetermined range of acceleration values, in which water in an exhaust pipe can be drained by the flow amount being raised by a certain amount.

* * * * *